Figure 1:
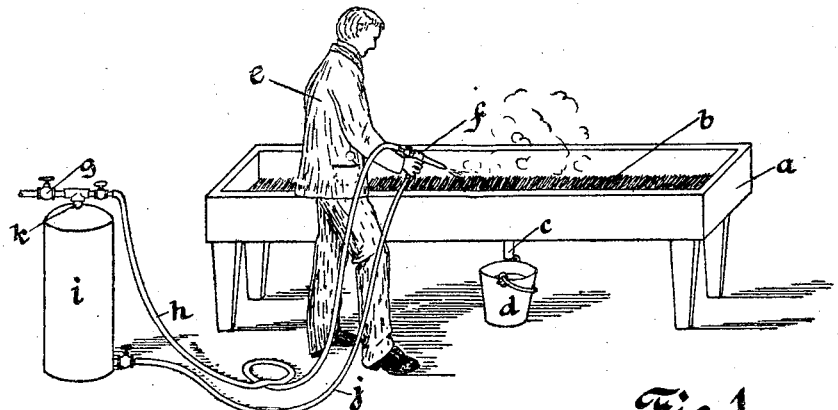

S. B. HEDDLES.
PROCESS OF RENOVATING, CLEANSING, AND AROMATIZING TOBACCO.
APPLICATION FILED JAN. 12, 1906.

937,801.

Patented Oct. 26, 1909.

Stewart B. Heddles, Inventor

Witnesses

UNITED STATES PATENT OFFICE.

STEWART B. HEDDLES, OF JANESVILLE, WISCONSIN.

PROCESS OF RENOVATING, CLEANSING, AND AROMATIZING TOBACCO.

937,801.  Specification of Letters Patent.  Patented Oct. 26, 1909.

Application filed January 12, 1906. Serial No. 295,775.

*To all whom it may concern:*

Be it known that I, STEWART B. HEDDLES, of Janesville, Wisconsin, have invented a Process of Renovating, Cleansing, and Aromatizing Tobacco, of which the following is a specification.

Leaf-tobacco, as it comes from the growers, often reaches the wholesale tobacco merchants or the consumers of tobacco in a hard and brittle condition, and is, moreover, subject to must and mold which seriously depreciate the value of the tobacco, as in the first case it is rendered more difficult of manipulation for the manufacture of cigars, and in the second case such must or mold naturally imparts a highly undesirable flavor to the products made from it. The hard and brittle condition of the tobacco is caused by the fact that it is packed green into cases and undergoes a natural sweating or fermentation before it can be unpacked and manipulated, and the heat of the fermentation causes an evaporation of the moisture contained in the original leaf. Also, the growth of must or mold upon the leaf so packed is presumably due to the deposit of moisture upon the hardened surface of the leaf while so packed. It is to be observed that the more northerly grown tobacco is more particularly subject to the growth of mold, and that of the Southern States is free from it, owing presumably to the greater strength of the Southern product and its larger content of nicotin.

It is the object of the process herein described to treat tobaccos which have reached the hard, brittle or moldy condition, to render them permanently soft and pliable, remove the moldy growths and prevent the redeposit of mold thereon, and further, to treat all kinds of leaf-tobacco for the purpose of giving it a special aroma or flavor of its own which may be varied to suit the tastes of different classes of consumers.

My process comprises in its essence the treatment of leaf-tobacco either once or repeatedly with a special composition of matter which accomplishes the purpose in view, and this treatment may take place either by immersing the tobacco in the liquid composition or by spraying it therewith in the manner which will be hereinafter more particularly described.

I have illustrated in the drawing attached to this specification two different ways in which my process is carried out according to circumstances.

Figure 2:
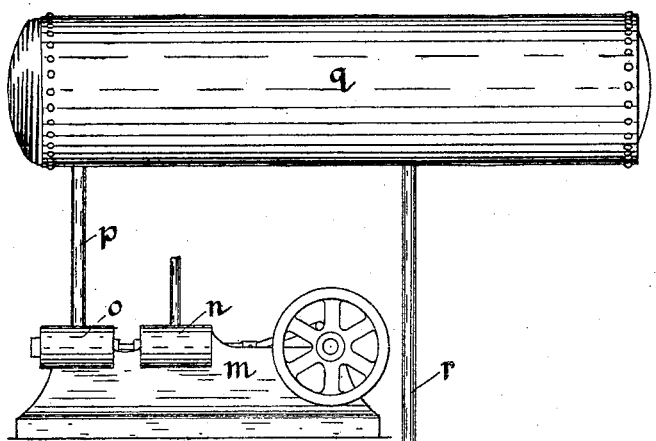
Figure 2:
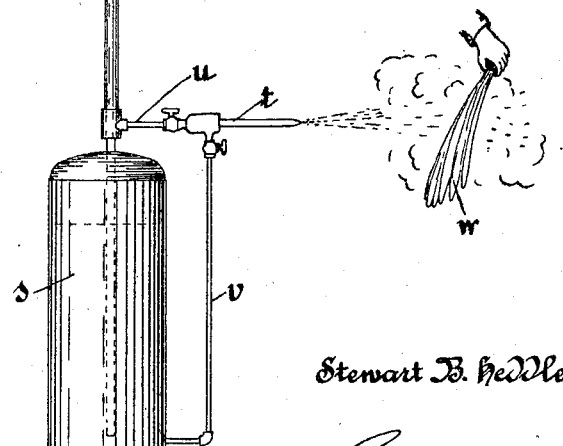

Figure 1 illustrates the method of spraying the tobacco in treatment tanks, and Fig. 2 the method of spraying it in separate hands or bunches. Ordinarily these will form successive steps of treatment of the same tobacco.

The tobacco is first taken from the original package in layers about one inch deep, each layer consisting of a row of small bunches or "hands" of about twelve leaves each tied together by their bases and extending across the packing-box from side to side with their bases even. It will be understood that the tobacco, when thus first taken from the case, is brittle and is not to be manipulated more than is necessary to place it in position to undergo the first step of the process, the separate hands or bunches sticking together and forming a continuous sheet.

The apparatus employed for the first step of the process as preferably carried out, comprises a shallow vat or tank $a$, on the bottom of which are spread out the aforesaid layers or sheets of leaf-tobacco $b$. This tank may have a drain $c$ into which the excess of liquid runs and is collected in any reservoir, as for example, a pail $d$. The operator $e$ employs an atomizer $f$ connected with a compressed-air-supply $g$ by a flexible hose $h$ and with a supply tank $i$ for the treating composition by means of a flexible hose $j$, the said tank $i$ being also connected with the supply $g$ for compressed air by a branch $k$. It will be understood that this is merely an example of one way of procuring a spray of the liquid, and that my process is not confined to the employment of this or any special form of apparatus. The operator sprays the tobacco in the tank $a$ by means of the atomizer $f$, covering it with a fine coating of the treating-composition, and the tobacco, after treatment on one side, is turned over and sprayed on the other side.

After spraying with the composition, the tobacco is removed from the vat and laid out in a warm, moist room where it remains for about four days until it has absorbed the moisture and has assumed a soft and pliable condition. During this time it is desirable to keep the tobacco well covered with rubber blankets so as to prevent the composition from evaporating. The tobacco being now pliable, the hands or bunches are separated and returned to the spraying room where they are treated as illustrated in Fig. 2. In this figure is shown an air-compressor *m* having a steam-cylinder *n* and an air-cylinder *o* from which latter a delivery-pipe *p* delivers the compressed air to a storage-tank *q*, whence the air is drawn off to one or a number of atomizing devices by means of pipes *r* (only one is shown in the drawing). The atomizing apparatus, as herein shown, comprises a liquid reservoir *s* containing the treatment-composition, an atomizer *t* (which may be of the ordinary concentric-tube type similar to air-brushes and the like) to which leads an air-pipe *u* branching from the pipe *r* and a liquid-pipe *v* drawing the composition from the bottom of the reservoir *s*. Each bunch or hand *w* of tobacco is successively held in the spray issuing from the atomizer *t*, and the bunch is shaken out and each leaf sprayed so that the spray may reach every part of the leaf either by direct contact or by absorption. After this second spraying operation the tobacco-leaves are returned to another case which is placed in a warm room and so left for several days until the moisture has become absorbed and evenly distributed, and when adjudged to be in proper condition are repacked in the original case and sampled and are then ready for market.

The treating-composition which I preferably use in this process will vary according to the results desired. The following, however, is one species of composition which I may use. This is composed of the following ingredients, to wit:

16 qts. cider vinegar
8 " claret or sour wine
1 pt. alcohol
½ " formaldehyde
¼ " fluid extract valerian
1 " New England rum
1 qt. extract or infusion of Havana stems.

These to be mixed and diluted with 80 to 100 per cent. of water. This composition is not herein claimed, as it forms the subject of a separate application, and, moreover, may be varied widely in accordance with the results desired.

Instead of or in addition to spraying the tobacco with my composition, the tobacco may be steeped or immersed therein, which produces similar results; but ordinarily the spraying method will be found preferable.

When treated according to my process, tobacco which has become hard, gray and moldy loses these injurious properties and acquires a new and bright appearance and a flavor all its own, thereby appreciating a large percentage in market value. Moreover, the tobacco, when so treated, remains in a soft pliable condition and cannot again become moldy and is ready for handling for the manufacture of cigars.

In many cases it may be found advantageous to treat according to my process tobacco which has not suffered from fermentation or mold, as inferior tobacco may thereby be given an artificial flavor peculiar to the higher grades, and, moreover, may be prevented from molding and kept in pliable condition.

Having thus described my invention, what I claim as new and desire to secure by Letters Patent, is:

1. The process of renovating moldy tobacco which consists in treating it in the form of a spray with a liquid containing formaldehyde and water.

2. The process of renovating moldy tobacco which consists in treating it in the form of a spray with a liquid containing formaldehyde, wines and spirits.

3. The process of treating tobacco for improving its market value consisting in first laying out the tobacco in a receiving-vessel, then spraying it with an atomized, liquid, mold-preventing and moisture-retaining composition, then causing it to remain in moist condition after spraying for a period of time during which said composition is absorbed and the material softened and conditioned for handling; then spraying the individual leaves thereof the second time with said composition and maintaining the tobacco moist until the composition is again absorbed.

In witness thereof I have hereunto set my hand this tenth day of January, 1906.

STEWART B. HEDDLES.

In presence of—
GEORGE WETMORE COLLES,
FLORENCE E. HILL.